United States Patent
Karp et al.

(10) Patent No.: US 11,636,132 B1
(45) Date of Patent: Apr. 25, 2023

(54) SYSTEMS AND METHODS FOR AUTOMATICALLY DERIVING DATA TRANSFORMATION CRITERIA

(71) Applicant: Wells Fargo Bank, N.A., San Francisco, CA (US)

(72) Inventors: Brian Karp, Charlotte, NC (US); Damon Antoine Porter, Charlotte, NC (US); Stacy Renee Henryson, Clive, IA (US); Ethan M. Hopkins, Bondurant, IA (US); Matthew Dean Wilson, Des Moines, IA (US)

(73) Assignee: Wells Fargo Bank, N.A., San Franscisco, CA (US)

( * ) Notice: Subject to any disclaimer, the term of this patent is extended or adjusted under 35 U.S.C. 154(b) by 145 days.

(21) Appl. No.: 17/177,029

(22) Filed: Feb. 16, 2021

(51) Int. Cl.
| | |
|---|---|
| *G06F 16/26* | (2019.01) |
| *G06F 16/25* | (2019.01) |
| *G06F 18/214* | (2023.01) |
| *G06N 20/00* | (2019.01) |
| *G06F 18/2415* | (2023.01) |

(52) U.S. Cl.
CPC ............ *G06F 16/26* (2019.01); *G06F 16/258* (2019.01); *G06F 18/214* (2023.01); *G06F 18/2415* (2023.01); *G06N 20/00* (2019.01)

(58) Field of Classification Search
CPC ...... G06F 16/26; G06F 16/258; G06K 9/6256
See application file for complete search history.

(56) References Cited

U.S. PATENT DOCUMENTS

| | | | | |
|---|---|---|---|---|
| 2016/0155069 A1* | 6/2016 | Hoover | .................. | G06Q 30/06 706/12 |
| 2019/0005115 A1* | 1/2019 | Warrier | ................ | G06V 10/764 |
| 2019/0147350 A1* | 5/2019 | Bai | ....... | G06Q 10/067 706/25 |
| 2019/0164084 A1* | 5/2019 | Gulin | ....................... | G06N 20/00 |
| 2019/0332892 A1* | 10/2019 | Wickesberg | .......... | G06F 16/283 |
| 2020/0160178 A1* | 5/2020 | Kar | ........................ | G06V 10/764 |
| 2020/0242483 A1* | 7/2020 | Shashikant Rao | ..... | G06N 20/10 |
| 2020/0349467 A1* | 11/2020 | Teague | .................. | G06F 16/278 |

* cited by examiner

*Primary Examiner* — Dangelino N Gortayo
(74) *Attorney, Agent, or Firm* — Womble Bond Dickinson (US) LLP (57) ABSTRACT

Systems, apparatuses, methods, and computer program products are disclosed for automatically deriving data transformation criteria. An example method includes receiving, by communications circuitry, a source dataset and a target dataset and identifying, by a model generator, a target variable. The example method further includes training, by the model generator, a decision tree for the target variable using the source dataset and the target dataset such that the trained decision tree can predict a value for the target variable from new source data. The example method further includes deriving, by a derivation engine, a set of parameters and pseudocode for producing the target variable from the source dataset.

20 Claims, 7 Drawing Sheets

DATA TRANSFORMATION DASHBOARD

SELECT TRANSFORMATION — OUTPUT CLASSIFICATION

PROPERTY TYPE ▽ — POTENTIAL EXCEPTION ▽

ENTER SEARCH TEXT

BANKRUPTCY CODE
INTEREST TYPE
LOAN PURPOSE
LOAN TYPE
NUMBER OF UNITS
ORIGINAL COMBINED LTV
ORIGINAL LOAN-TO-VALUE
ORIGINAL PROPERTY VALUE
PRODUCT TYPE CODE
PROPERTY TYPE
REMAINING TERM

TAL RECORDS     ACCURACY
13,629     100.0%

PREDICTED VALUE
SINGLE FAMILY RES
SINGLE FAMILY RES
TOWNHOUSE

529962270   CONDO

DATA TRANSFORMATION DASHBOARD

SELECT TRANSFORMATION    OUTPUT CLASSIFICATION

PROPERTY TYPE ▽    POTENTIAL EXCEPTION ▽

(ALL)
CORRECT PREDICTION
POTENTIAL EXCEPTION

EXCEPTIONS    TOTA    RACY
0    13,629    100.0%

DETAILS

| LOAN # | ACTUAL VALUE | PREDICTED VALUE |
|---|---|---|
| 308870670 | OTHER | SINGLE FAMILY RES |
| 529928970 | 2-4 UNITS | SINGLE FAMILY RES |
| 529962270 | CONDO | TOWNHOUSE |

FIG. 6B

SYSTEMS AND METHODS FOR AUTOMATICALLY DERIVING DATA TRANSFORMATION CRITERIA

TECHNOLOGICAL FIELD

Example embodiments of the present disclosure relate generally to machine learning and, more particularly, to systems and methods for using machine learning to understand how data is transformed and applied, and leveraging that understanding for error-reduction and predictive analysis.

BACKGROUND

The volume of data available for inspection and use has grown substantially over the last few decades, and it grows at a faster rate each year. In parallel, computing resources have become more powerful and the techniques for analyzing data increase in their nuance. As a result of these changes, there is an ever-increasing reliance on data in all areas of business and life. Moreover, reliance on this data increasingly requires the transformation of data from one format to another, whether because a particular data evaluation requires data to be presented in a new format, because data must be collected from a variety of source repositories that do not store the data in the same format, or for any number of other reasons. Accordingly, transformation of data is an unavoidable aspect of the use of large datasets.

BRIEF SUMMARY

Given that almost all uses of data involve the transformation of the data from its original form into some new form, understanding the ways that data is transformed is critical for monitoring, auditing, or reviewing the ways that the data is used. Accordingly, the development of new tools for this purpose solves a currently unmet need for technical and automatic solutions that avoid the bias, error, and resource-intensity inherent in manual methods for tracking data lineage.

Historically, documenting the transformations of data has been a manual exercise, and the veracity of the documentation has always been indeterminate (was it done well, or as an after-thought?). In fact, ad hoc manual documentation is largely the default practice even today. However, when an organization must evaluate the lineage of its data to ensure accuracy and avoidance of errors, it may often be the case that the nature of the transformations made to data are opaque, either because of the number of intermediate transformations to the data between its source repository and a given application of that data, or because the transformations were not all undertaken in a single location, by a single actor or entity, or at a single time, or perhaps the documentation was never prepared for every transformation along the way, or the documentation describing the nature of a given data transformation is inaccurate, which may occur for any number of reasons. Accordingly, an organization may not be positioned to understand the nature of how its data has been transformed through the point at which the organization wishes to utilize the data.

As noted above, this lack of authoritative understanding of data transformations presents a critical technical hurdle that organizations must overcome in order to authoritatively rely on the data that is used in various tasks. When the data is used for purposes such as regulatory reporting, or mission-critical applications, errors in the data transformations can cause significant failures that can materially impact the organization. Moreover, where the lineage of a given data element is not known to any individual in an organization, there is a significant technical challenge posed for deriving the nature of the transformations that the data element undertook in the course of a given operation.

Systems, apparatuses, methods, and computer program products are disclosed herein for addressing these technical hurdles by automatically deriving the criteria causing the transformation of data from a source dataset to a target dataset generated from the source dataset. As described below, example embodiments described herein may be provided the source dataset and the target dataset, and may derive the data transformation criteria for a particular target variable.

In one example embodiment, a system is provided for automatically deriving the data transformation criteria for such a target variable. The system includes communications circuitry configured to receive a source dataset and a target dataset, and a model generator configured to identify a target variable, and train a decision tree for the target variable using the source dataset and the target dataset such that the trained decision tree can predict a value for the target variable from new source data. The system further includes a derivation engine configured to derive a set of parameters and pseudocode for producing the target variable from the source dataset.

In another example embodiment, a method is provided for automatically deriving the data transformation criteria for the target variable. The method includes receiving, by communications circuitry, a source dataset and a target dataset, and identifying, by a model generator, a target variable. The method further includes training, by the model generator, a decision tree for the target variable using the source dataset and the target dataset such that the trained decision tree can predict a value for the target variable from new source data, and deriving, by a derivation engine, a set of parameters and pseudocode for producing the target variable from the source dataset.

In yet another example embodiment, a computer program product is provided for automatically deriving the data transformation criteria for the target variable. The computer program product includes at least one non-transitory computer-readable storage medium storing software instructions that, when executed, cause an apparatus to receive a source dataset and a target dataset, and identify a target variable. The software instructions, when executed, further cause the apparatus to train a decision tree for the target variable using the source dataset and the target dataset such that the trained decision tree can predict a value for the target variable from new source data. Furthermore, the software instructions, when executed, further cause the apparatus to derive a set of parameters and pseudocode for producing the target variable from the source dataset.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for deriving the data transformation criteria for a target variable given a source dataset and a target dataset generated from the source dataset. Traditionally, it has been very difficult to determine these data transformation criteria, and even where such criteria have been collected, it generally has been a result of human effort, rather than authoritative data evaluation, which introduces significant potential for error. In addition, historically there has been no reliable and consistently applicable tool for generating such data transformation criteria, and thus the veracity of a target variable's data lineage cannot be reliably estimated based on the methodology used to derive it. As noted above, this lack of authoritative understanding of data transformations presents a critical technical hurdle that organizations must overcome in order to authoritatively rely on the data that is used in various tasks.

In contrast to the conventional and ad hoc methods for determining the methodology by which data transformations occur for a target variable, the present disclosure describes the application of machine learning tools to systematically derive such information. At a high level, example embodiments receive a source dataset and a target dataset, along with an identification of a target variable at issue. Following receipt of this information, example embodiments train a decision tree classifier using the received information, such that the decision tree can reliably predict a new value for the target variable from new source data. Following generation of the decision tree, example embodiments may thereafter derive a set of parameters and pseudocode for producing the target variable from the source dataset. Further detail regarding these various steps is provided below. In certain embodiments, however, the trained decision tree may be utilized for other reasons than for deriving the set of parameters and pseudocode. For instance, the trained decision tree may be used to enable presentation of an interactive dashboard visualization to a user to illustrate the nature of the data transformations that may occur for the target variable. In another example, the trained decision tree may be used prospectively to generate an exception report for future uses of the data transformation in question on new data. Similarly, in yet another example, the trained decision tree may be used prospectively for trend analysis, by identifying any divergence in future outcome distributions from historical outcome distributions for a target variable, which may serve to identify potential errors or fundamental changes in the initial source of the data used for transformation of the target variable.

In doing this, the present disclosure sets forth systems, methods, and apparatuses that utilize machine learning solution to enable systematic understanding and utilization of the parameters and pseudocode for producing a given target variable from a source dataset. There are many advantages of these and other embodiments described herein. For instance, through the performance of the operations described herein, example embodiments provide technical improvements such as the avoidance of manual error, increase in the consistency of data lineage documentation efforts, and thereby ensure greater accuracy and reliability of the various uses of data by a given organization.

Although a high level explanation of the operations of example embodiments has been provided above, specific details regarding the configuration of such example embodiments are provided below.

System Architecture

Figure 1:
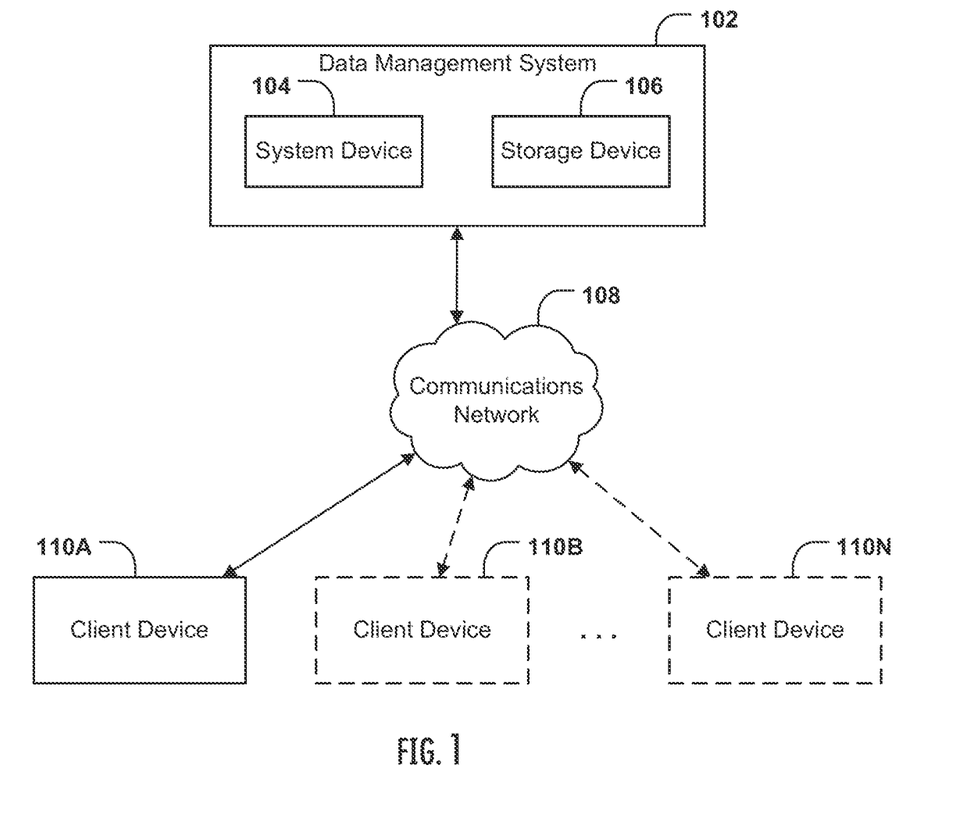
FIG. 1 illustrates a system in which some example embodiments may be used to derive data transformation criteria for a target variable.

Example embodiments described herein may be implemented using any of a variety of computing devices or servers. To this end, FIG. 1 illustrates an example environment within which embodiments of the present disclosure may operate. As illustrated, a data management system 102 may include a system device 104 in communication with a storage device 106. Although system device 104 and storage device 106 are described in singular form, some embodiments may utilize more than one system device 104 and/or more than one storage device 106. Additionally, some embodiments of the data management system 102 may not require a storage device 106 at all. Whatever the implementation, the data management system 102, and its constituent system device(s) 104 and/or storage device (s) 106 may receive and/or transmit information via communications network 108 (e.g., the Internet) with any number of other devices, such as one or more of client device 110A, client device 110B, through client device 110N.

System device 104 may be implemented as one or more servers, which may or may not be physically proximate to other components of the data management system 102. Furthermore, some components of system device 104 may be physically proximate to the other components of the data management system 102 while other components are not. System device 104 may receive, process, generate, and transmit data, signals, and electronic information to facilitate the operations of the data management system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the data management system 102 and/or the system device 104. Storage device 106 may store information relied upon during operation of the data management system 102, such as various machine learning techniques that may be used by the data management system 102, data and documents to be analyzed using the data management system 102, or the like. In addition, storage device 106 may store control signals, device characteristics, and access credentials enabling interaction between the data management system 102 and one or more of client device 110A through client device 110N.

Client device 110A through client device 110N may be embodied by any computing devices known in the art, such as desktop or laptop computers, tablet devices, smartphones, or the like. Client device 110A through client device 110N need not themselves be independent devices, but may be peripheral devices communicatively coupled to other computing devices.

Although FIG. 1 illustrates an environment and implementation of the present disclosure in which the data management system 102 interacts with one or more of client device 110A through client device 110N, in some embodiments users may directly interact with the data management system 102 (e.g., via input/output circuitry of system device 104), in which case a separate client device may not be required. Whether by way of direct interaction or via a separate client device, a user may communicate with, operate, control, modify, or otherwise interact with the data management system 102 to perform functions described herein and/or achieve benefits as set forth in connection with this disclosure.

Example Implementing Apparatuses

Figure 2:
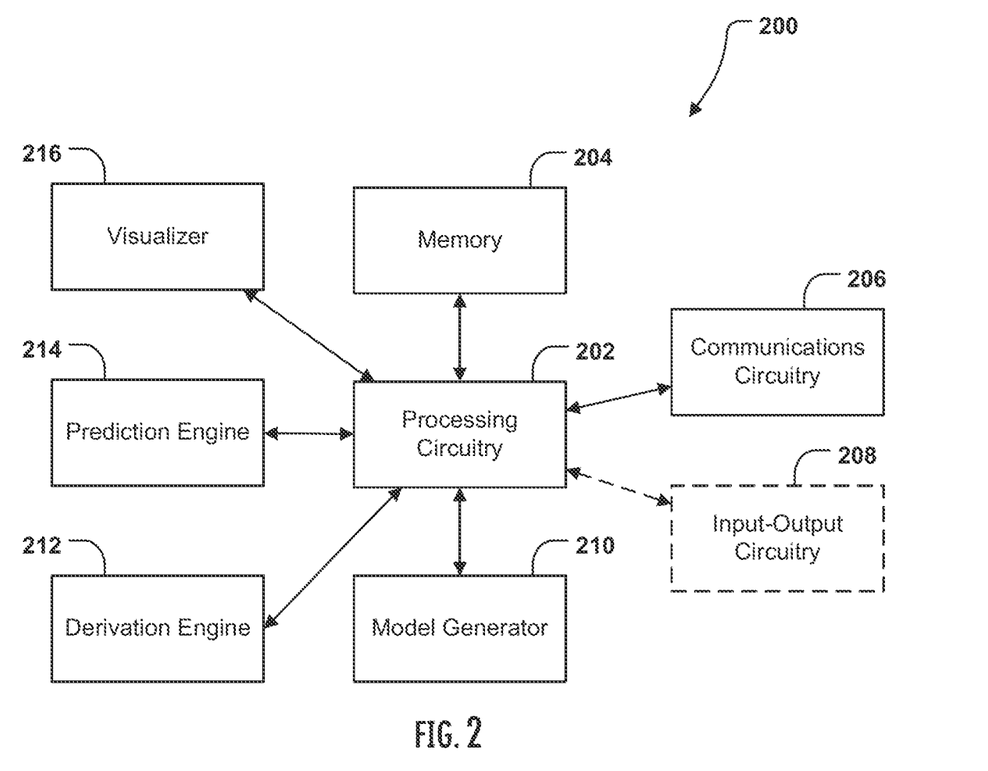
FIG. 2 illustrates a schematic block diagram of example circuitry embodying a device that may perform various operations in accordance with some example embodiments described herein.

System device 104 of the data management system 102 may be embodied by one or more computing devices or servers, shown as apparatus 200 in FIG. 2. As illustrated in FIG. 2, the apparatus 200 may include processor 202, memory 204, communications circuitry 206, input-output circuitry 208, model generator 210, derivation engine 212, prediction engine 214, and visualizer 216, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIG. 3.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a client device 112 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a model generator 210 configured to train a decision tree for a target variable. The model generator 210 may utilize processor 202, memory 204, or any other hardware component included in the apparatus 200 to perform these operations, as described in connection with FIG. 3 below. The model generator 210 may further utilize communications circuitry 206 to gather data from a variety of sources (e.g., client device 110A through client device 110N or storage device 106, as shown in FIG. 1), and may utilize input-output circuitry 208 to receive data from a user.

In addition, the apparatus 200 further comprises a derivation engine 212 configured to derive a set of parameters and pseudocode for producing the target variable from a source dataset. The derivation engine 212 may utilize processor 202, memory 204, or any other hardware component included in the apparatus 200 to perform these operations, as described in connection with FIG. 3 below. The derivation engine 212 may further utilize communications circuitry 206 to gather data from a variety of sources (e.g., client device 110A through client device 110N or storage device 106, as shown in FIG. 1), and may utilize input-output circuitry 208 to receive data from a user.

In addition, the apparatus 200 further comprises a prediction engine 214 configured to predict values for a target variable based on new input data, and to identify exceptions and/or distributional trends in such predicted values. The prediction engine 214 may utilize processor 202, memory 204, or any other hardware component included in the apparatus 200 to perform these operations, as described in connection with FIG. 3 below. The prediction engine 214 may further utilize communications circuitry 206 to gather data from a variety of sources (e.g., client device 110A through client device 110N or storage device 106, as shown in FIG. 1), and may utilize input-output circuitry 208 to receive data from a user.

Finally, the apparatus 200 may also comprise a visualizer 216 configured to generate graphical visualizations of various data components for presentation to a user. The visualizer 216 may utilize processor 202, memory 204, or any other hardware component included in the apparatus 200 to perform these operations, as described in connection with FIG. 3 below. The visualizer 216 may further utilize communications circuitry 206 to transmit and/or gather data from a variety of sources (e.g., client device 110A through client device 110N or storage device 106, as shown in FIG. 1), and may utilize input-output circuitry 208 to transmit and/or receive data from a user.

Although components 202-216 are described in part using functional language, it will be understood that the particular implementations necessarily include the use of particular hardware. It should also be understood that certain of these components 202-216 may include similar or common hardware. For example, the model generator 210, derivation engine 212, prediction engine 214, and visualizer 216 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the model generator 210, derivation engine 212, prediction engine 214, and visualizer 216 may leverage processor 202, memory 204, communications circuitry 206, and/or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the model generator 210, derivation engine 212, prediction engine 214, and visualizer 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the other components describe above as comprising the apparatus 200.

As will be appreciated based on this disclosure, example embodiments contemplated herein may be implemented by apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of an example apparatus 200, example embodiments of the present disclosure are described below in connection with a series of graphical user interfaces and flowcharts.

Example Operations

Figure 3:
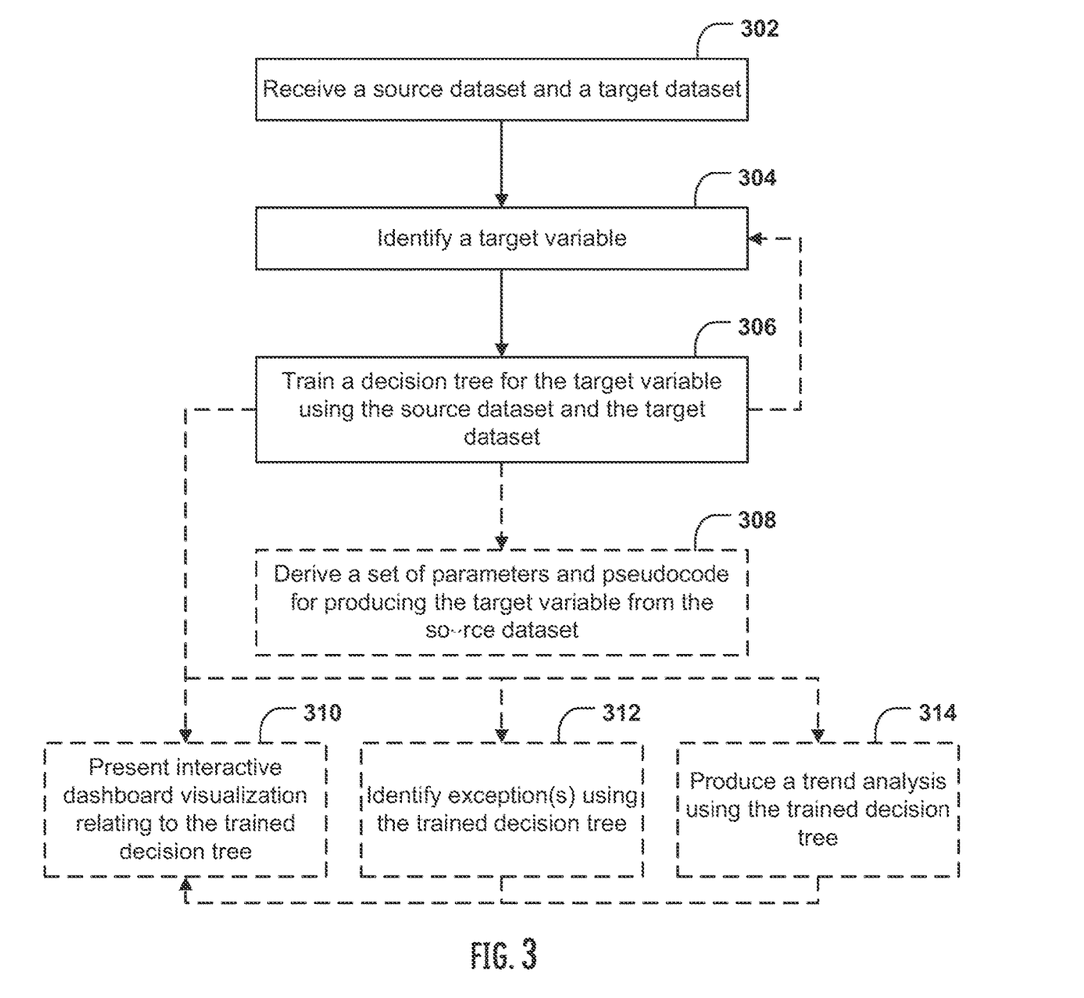
FIG. 3 illustrates an example flowchart for training and utilizing a decision tree for data transformations relating to a target variable, in accordance with some example embodiments described herein.

Turning to FIG. 3, a flowchart is illustrated that contains example operations for automatically training a decision tree for a target variable, and for performing additional operations using the trained decision tree. The operations illustrated in FIG. 3 may, for example, be performed by system device 104 of the data management system 102 shown in FIG. 1, which may in turn be embodied by an apparatus 200, which is shown and described in connection with FIG. 2. To perform the operations described below, the apparatus 200 may utilize one or more of processing circuitry 202, memory 204, communications circuitry 206, input-output circuitry 208, model generator 210, derivation engine 212, prediction engine 214, and visualizer 216, and/or any combination thereof. It will be understood that user interaction with the data management system 102 may occur directly via input-output circuitry 208, or may instead be facilitated by a separate client device 110, as shown in FIG. 1, and which may have similar or equivalent physical componentry facilitating such user interaction.

As shown by operation 302, the apparatus 200 includes means, such as model generator 210, or the like, for receiving a source dataset and a target dataset. The source dataset comprises input data that has been transformed, while the target dataset comprises the output from the transformation. The model generator 210 receives the source dataset and the target dataset for this data transformation to enable training of a decision tree that can systematically re-create the transformations that were used to generate the target dataset from the source dataset. The model generator 210 may thereafter combine the source dataset and the target dataset to create a training dataset to be used for further processing as set forth below in connection with operations 304 and 306.

It will be understood that the source dataset and target dataset may be received in various ways. For instance, some or all of the source dataset and the target dataset may have been previously stored by a storage device 106, which may comprise memory 204 of the apparatus 200 or a separate storage device. At operation 302, the model generator 210 may retrieve the previously stored data from the memory 204 or storage device 106. In another example, some or all of the source dataset and the target dataset may be provided by a separate device (e.g., one of client device 110A through client device 110N), in which case the model generator 210 may leverage communications circuitry 206 to receive the relevant data from that separate device. In another example, some or all of the data comprising the source dataset and the target dataset may be provided directly to the apparatus 200 through user data entry or from a peripheral device, in which case the model generator 210 may receive the relevant data via input-output circuitry 208. Of course, the model generator 210 may receive some or all of the source dataset and/or the target dataset from a combination of these sources.

As shown by operation 304, the apparatus 200 includes means, such as model generator 210 or the like, for identifying a target variable. The target variable may be identified by the model generator 210 in many ways. For instance, the target variable may be user-specified, and in such instances the model generator 210 may identify the target variable based on receipt of an indication of a user-selected target variable. For instance, just as the source dataset and the target dataset may be received from a storage device, an indication of a user-selection of a target variable may have been previously stored by a storage device, and the model generator 210 may identify the target variable by querying the storage device for the stored indication of the desired target variable. Of course, the target variable may also be specified manually (e.g., in real-time or near-real-time) by a user interacting with the apparatus 200 via a separate device (e.g., client device 110A through client device 110N) or via the input-output circuitry 208 of the apparatus 200 itself. The model generator 210 may alternatively identify the target variable unilaterally, such as where the model generator 210 has been instructed to train a decision tree for every target variable associated with the source dataset and the target dataset. To do this, upon receipt and combination of the source dataset and the target dataset, the model generator may identify a number of target variables and may sequentially identify each one and train a corresponding decision tree (as will be described below in connection with operation 306).

As shown by operation 306, the apparatus 200 includes means, such as model generator 210 or the like, for training a decision tree for the target variable using the source dataset and the target dataset, such that the trained decision tree can predict a new value for the target variable from new source data. As noted previously, the source dataset and the target dataset may be combined to create a training dataset, which is used for this purpose. It will be understood that training the decision tree may involve one or more pre-processing steps to improve the suitability of this training dataset for the actual training operation, as well as a number of sub-steps not explicitly illustrated in FIG. 3.

As far as pre-processing the training dataset, the model generator 210 may cleanse the training dataset to enhance the training process. To this end, the cleansing process may remove null or otherwise unique fields from the training dataset that were included in the source dataset or target dataset but that are unrelated to the transformation of a data element from the source dataset to the target dataset. Removing ancillary data elements will reduce the resource intensity of the training operation, and may also prevent the training process from erroneously taking such data into account, and may thus prevent the overfitting the training data.

Similarly, prior to training the decision tree, the cleansed data may need further manipulation to mitigate the effects of any imbalance in important data elements. For instance, the model generator 210 may determine if an imbalance of values of the target variable exists in the training data. Decision trees often produce poor predictive effect when trained on imbalanced data, so balancing the data may enhance the predictive performance of the trained decision tree. In an instance in which the model generator 210 determines that an imbalance of values of the target variable exists in the target dataset, the model generator 210 may modify the training dataset to reduce this imbalance. To this end, the model generator 210 may undersample data points appearing to be overrepresented and/or oversample data points appearing to be underrepresented. While undersampling can be as simple as not using every data point, oversampling of data points can be more complex. Accordingly, one technique that may be employed is for the model generator 210 to utilize a synthetic minority over-sampling technique that allows for the creation of synthetic minority class events while also under sampling of the majority class to balance the dataset. The creation of synthetic minority class events may be performed by evaluating all of the independent variables associated with target variable and then simulating additional rows of data that have similar, but not necessary identical, values.

The training process itself begins with selection, by the model generator 210 of a base decision tree algorithm, which may be any of a classification and regression tree (CART), the Iterative Dichotomiser 3 (ID3), C4.5, CART, Chi-square automatic interaction detection (CHAID), multivariate adaptive regression splines (MARS), conditional inference tree, or other decision tree algorithm. The model generator 210 may select a decision tree algorithm based on a predefined setting defined by an entity, or the model generator 210 may select the decision tree in response to user input specifying an appropriate decision tree algorithm (and this user input may be received via communications circuitry 206 from a separate client device or via input-output circuitry 208). Furthermore, training the decision tree itself may thereafter comprise selecting and potentially optimizing (e.g., tuning) various hyperparameters associated with the decision tree algorithm. Such hyperparameters may include the maximum depth of the decision tree, the decision criteria to be used branches of the decision tree, and the like. To this end, the model generator 210 may rely on predefined hyperparameter selections, explicit user input defining requested hyperparameters, or the model generator 210 may automatically optimize hyperparameters. To automatically optimize the hyperparameters used in training of the decision tree, the model generator 210 may separate the training dataset into training, validation, and test datasets, and then may iterate through various hyperparameter combinations, training a decision tree using the various hyperparameter combinations, and evaluating relative predictive performance of the trained decision trees on the test datasets, and finally selecting the combination of hyperparameters maximizing predictive performance.

Figure 4:
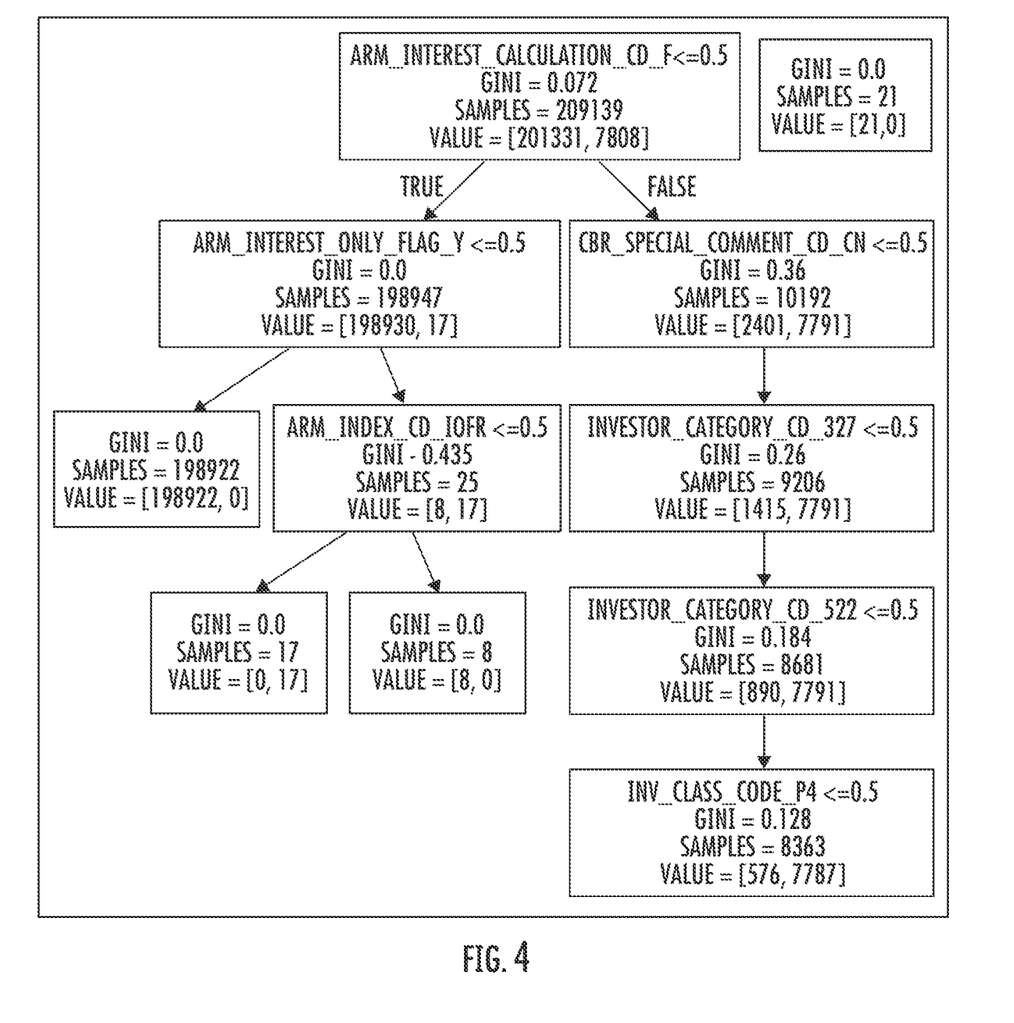
FIG. 4 illustrates an example illustration of a trained decision tree for a target variable, as may be produced by example embodiments described herein.

Following selection and possible optimization of hyperparameters of the decision tree, the model generator 210 thus trains a decision tree to predict a new value for the target variable from new source data. The training operation itself may extract a percentage of the training dataset as a holdout set (e.g., retaining 80% of the data for training while holding out 20% for testing), or may utilize a cross-validation technique. In any event, the model generator 210 may thus train a decision tree based on the training dataset to maximize the predictive capacity of the decision tree with respect to the target variable. An example decision tree as generated in this fashion is illustrated in FIG. 4.

As shown by the dotted line in FIG. 3 from operation 306 back to operation 304, the model generator 210 may train a decision tree for a particular target variable, but may thereafter repeat the target variable identification and decision tree training process again (such as where a decision tree is desired for multiple variables contained in the source dataset and target dataset). In this fashion, the model generator 210 may train decision trees for each of the variables at issue, thus enabling holistic identification, modeling, and evaluation of all of the data transformations between the source dataset and the target dataset. Following training of one or more decision trees as set forth in operations 302, 304, and 306, the procedure may advance to any and/or all of operations 308, 310, 312, and 314, as will be described below.

As shown by operation 308, the apparatus 200 includes means, such as derivation engine 212 or the like, for deriving a set of parameters and pseudocode for producing the target variable from the source dataset. Although a decision tree itself may reliably predict the transformations occurring for a target variable, greater insight into the nature of the data transformation may be gained from unpacking the decision-making architecture of the decision tree into a different form. To this end, the derivation engine 212 may extract filter criteria and associated parameters from each branch of the trained decision tree. Using the trained decision tree illustrated in FIG. 4 as an example, the derivation engine 212 may, for instance, begin at the top node of the illustrated decision tree, and may identify an initial filter criterion associated with the top node of the decision tree (in this case, a query regarding whether a parameter value is less than or equal to 0.5). Moreover, the derivation engine 212 may identify the parameter upon which the filter is performed (in this case, the value for the "ARM_INTEREST_CALCULATION_CD_F" data element). Subsequently, the derivation engine 212 may move down one layer of the decision tree and similarly identify the parameters and filter criteria for the nodes at that second layer of the decision tree, and so forth, until all of the nodes of the decision tree have been traversed, and constituent pseudocode (e.g., filter criteria) and parameters are identified. The derivation engine 212 may then generate, from the extracted filter criteria and associated parameters for each branch of the decision tree, a holistic set of the parameters and pseudocode that, altogether, produce the target variable from the source dataset in any given instance.

As shown by operation 310, the apparatus 200 includes means, such as visualizer 216 or the like, for presenting a dashboard visualization to the user. In some embodiments, the dashboard visualization does not permit user interaction, although in other embodiments dashboard visualization may be interactive, insofar as particular elements illustrated on the screen are user-adjustable, and adjustment of those elements causes corresponding changes to the graphical illustration. The interactive dashboard visualization may illustrate information regarding the trained decision tree for the target variable. Moreover, it will be understood that the visualizer 216 may present any number of different dashboard visualizations to the user.

For instance, one example visualization that the visualizer 216 may provide to the user is a dashboard visualization of the trained decision tree itself, such that the interactive dashboard visualization enables the user to traverse the branches of the trained decision tree. To this end, the user may be presented with a holistic view of the trained decision tree such as that shown in FIG. 4. In response to receipt, by the visualizer 216, of user input indicating selection of a particular node of the graphical illustration, the visualizer 216 may render a close-up visualization of the selected node, along with the filter criteria and relating parameter information. Further user input may prompt the visualizer 216 to cause rendering of different elements of the trained decision tree, such that the user may explore the various nodes and branches of the trained decision tree in a visual fashion visually inspect the parameters and pseudocode affecting the traversal of the trained decision tree.

Figure 5:
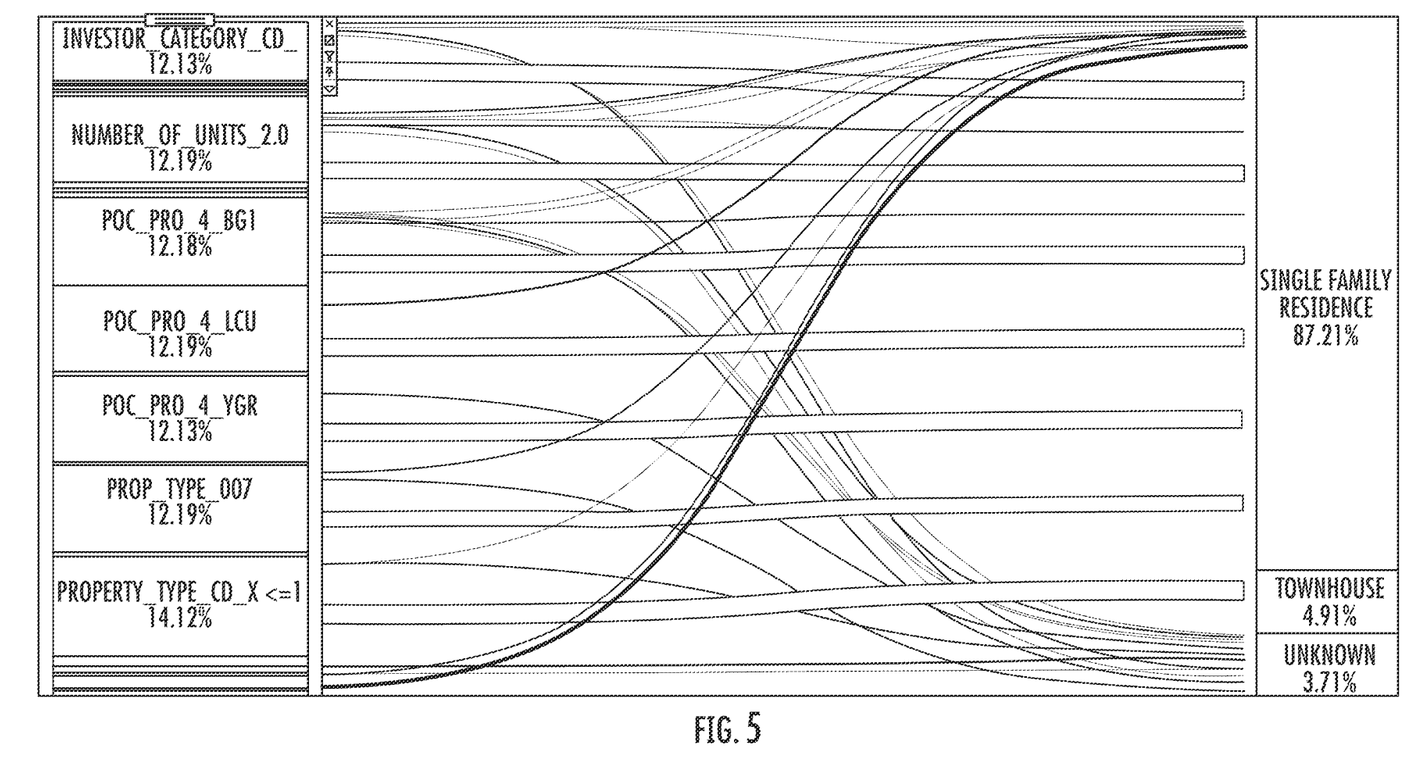
FIG. 5 illustrates an example Sankey chart that may be presented to a user, in accordance with some example embodiments described herein.

Yet another example visualization that may be presented to the user is shown in FIG. 5, which illustrates a Sankey chart that shows the impact of various parameters in the input dataset on the value of the target variable in the target dataset. A Sankey chart of this nature is an alternative way to graphically illustrate the parameters and filters used to convert data in the source dataset into the various values that may be obtained for the target variable in the target dataset. As shown in FIG. 5, when a particular value of a target value is selected on the right-hand side of the graphical illustration (in FIG. 5, the value "Single Family Residence" is selected), a percentage is listed under the heading for each data element to indicate a percentage of that data element that are involved in the transformation producing the selected value for the target variable. This percentage indicator thus enhances the descriptive capacity of the Sankey chart to describe the nature of the transformation that occurs for the target variable between the source dataset and the target dataset.

Figure 6:
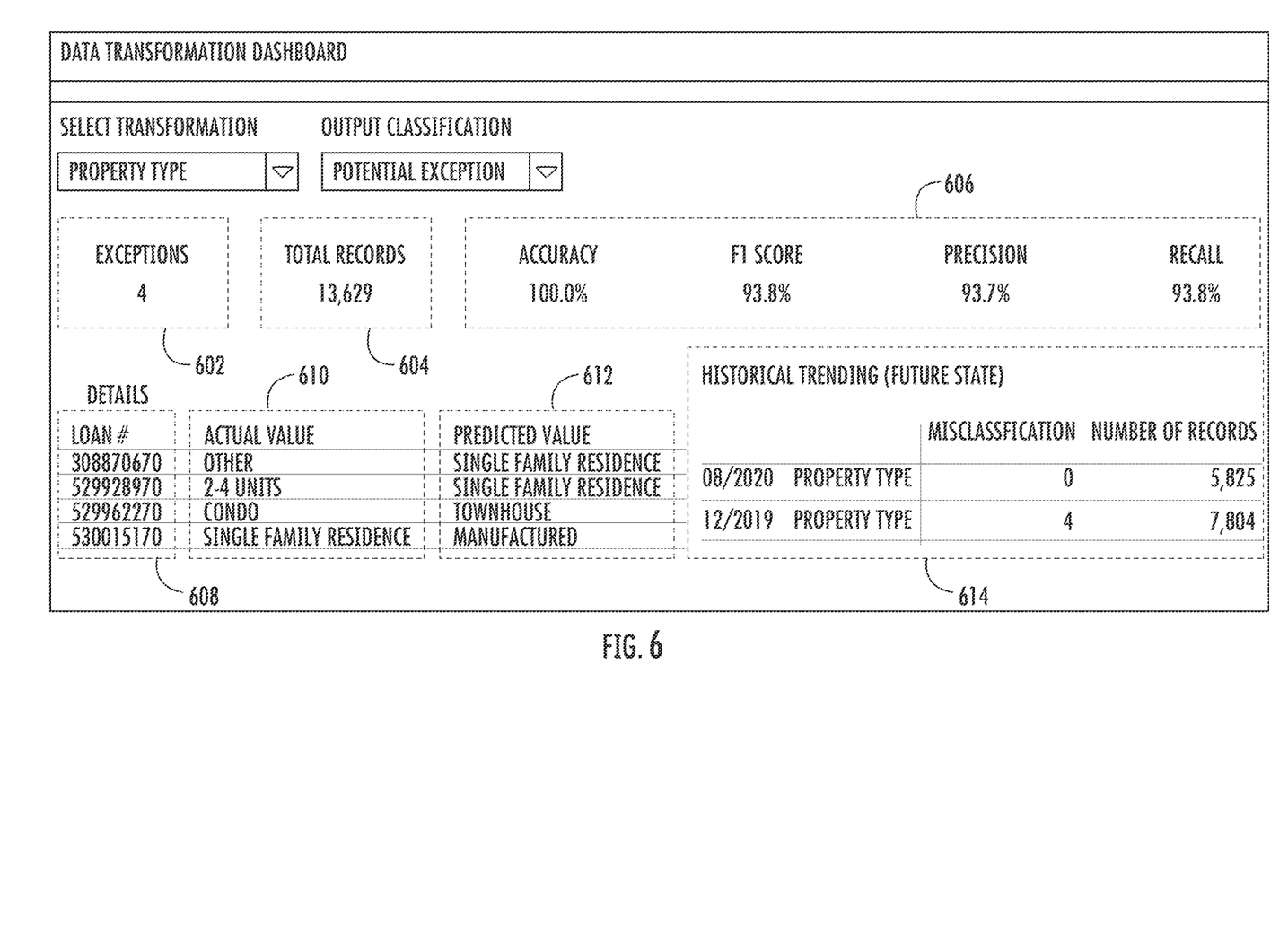
FIG. 6 illustrates an example dashboard visualization that may be presented to a user, in accordance with some example embodiments described herein.
Figure 6A:
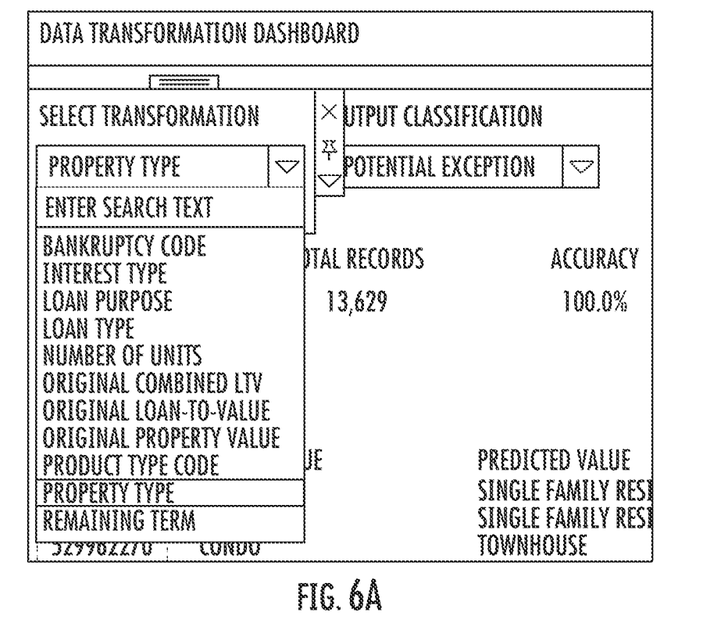
FIG. 6A illustrates an example set of menu options listing target variable options about which the example dashboard of FIG. 6 may render information.
Figure 6B:
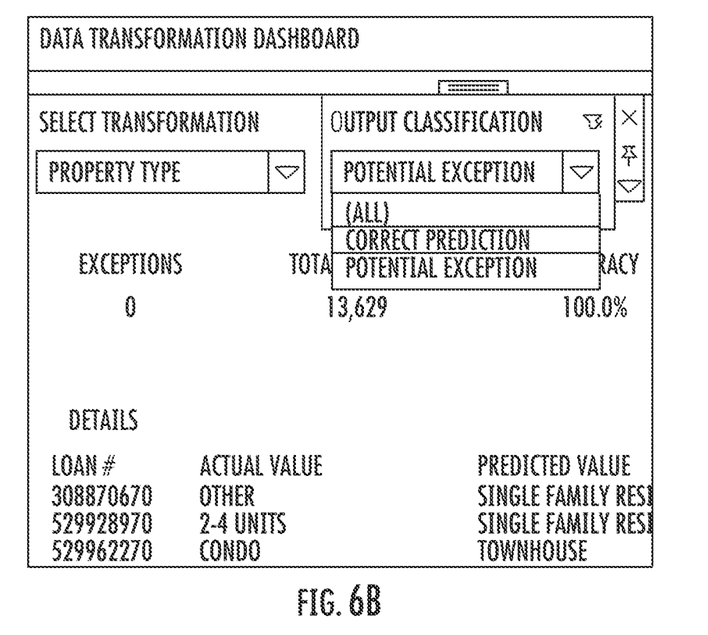
FIG. 6B illustrates an example set of menu options listing output classifications defining the type of information that may be rendered by the example dashboard of FIG. 6.

Another example dashboard visualization that may be presented to the user is shown in FIG. 6, which sets forth a summary exception report that may inform a user of the nature and volume of exceptions identified by the trained decision tree (as described in greater detail below in connection with operation 312). An exception, in this regard, may comprise an instance in which the trained decision tree for a target variable predicts that a source dataset will produce a first value for the target variable, but the actual value in the target dataset for the target variable is different from the predicted value. This dashboard may illustrate the number of exceptions 602 identified for a given number of records 604, along with various metrics defining the predictive performance 606 of the trained decision tree itself, thereby enabling a user to understand the predictive performance of the trained decision tree when evaluating the exceptions (in this regard, the predictive performance 606 of the trained decision tree may be illustrated using one or more metrics, such as accuracy, F1 score, precision, and recall, or any other metrics as may be desired in a given implementation). The example dashboard visualization shown in FIG. 6 presents information regarding potential exceptions, and as such lists the record number 608 for each of the identified potential exceptions, along with the actual value 610 for the target variable in question, along with the trained decision tree's predicted value 612 of the value for the target variable. Finally, the dashboard visualization may illustrate a historical misclassification trend 614 for the target variable over time. It will be understood that the illustration of the historical misclassification trend 614 may be in tabular form, as shown in FIG. 6, although in some embodiments it may comprise a time series chart (such as an area graph) showing, over time, the number of records reviewed plotted against the number of potential exceptions. FIG. 6A illustrates an example set of menu options listing target variables that may be selected and, when a target variable is selected, the dashboard visualization shown in FIG. 6 may render information regarding that selected target variable (leveraging the decision tree trained for that particular target variable). FIG. 6B illustrates an example set of menu options listing output classifications defining the type of information that may be rendered by the example dashboard of FIG. 6. For instance, the dashboard visualization of FIG. 6 may illustrate potential exceptions but not correct predictions, it may illustrate correct predictions but not potential exceptions, or it may illustrate each and every record under examination (whether a potential exception or a correct prediction).

Yet another visualization that may be shown to the user is a trend analysis. To this end, the visualizer 216 may leverage the distributional outcomes produced by the prediction engine 214 as set forth in operation 314 below in order to illustrate to a viewer changes in the distribution of values of the target variable on new data, when compared to a baseline distribution of the values of the target variable from the target dataset used during training of the decision tree for the target variable.

Regardless of which specific dashboard visualization is provided, the provision of such visualizations thereby conveys actionable insight into the nature of the data transformation between the source dataset and the target dataset As shown by operation 312, the apparatus 200 includes means, such as prediction engine 214 or the like, for identifying one or more exceptions using the trained decision tree. To this end, the prediction engine 214 may receive a new source dataset and a new target dataset. In similar fashion as described previously, these new datasets may be received from a storage device, from a separate client device 110 via communications circuitry 206, or directly via input-output circuitry 208. Following receipt of the new source dataset and the new target dataset, the prediction engine 214 may generate, using the trained decision tree and the source dataset, a set of predicted target values. The prediction engine 214 may then compare the set of predicted target values to corresponding data in the target dataset to evaluate whether a predicted target value deviates from the actual value. The prediction engine 214 may then produce an exception report identifying one or more differences between the set of predicted target values and the corresponding data in the target dataset. Additionally or alternatively, the procedure may proceed to operation 310 for presentation of an exception report dashboard visualization as described previously. Regardless of the manner by which exceptions are conveyed to a user, the identification of exceptions by the trained decision tree essentially comprises an estimate of the likelihood that newly ingested data is properly classified. If the trained decision tree identifies more than some predetermined number (or percentage) of exceptions, it is possible that the new target dataset was not properly generated, and further analysis may be performed to verify the data before it impacts downstream uses of that data.

Finally, as shown by operation 314, the apparatus 200 includes means, such as prediction engine 214 or the like, for producing a trend analysis using the trained decision tree. To this end, the prediction engine 214 may initially determine a baseline distribution of values of the target variable in the target dataset. The prediction engine 214 may then receive a new source dataset from a storage device or via communications circuitry 206 or input-output circuitry 208. The prediction engine 214 may then generate, using the trained decision tree and the new source dataset, a set of predicted target values of the target variable. The prediction engine 214 may then determine, from the set of predicted target values for the target variable, a distribution of the predicted values of the target variable. The prediction engine 214 may then compare the baseline distribution of target values for the target variable to the distribution of the predicted values of the target variable. Where the distribution of predicted values deviates from the baseline distribution more than a predetermined amount (and the predetermined amount may be a default value available to the prediction engine 214, or it may be a value specified by a user), the prediction engine 214 may identify that a deviation has occurred from the baseline distribution trend. Similarly, the prediction engine 214 may alternatively identify how much of a deviation exists between the distribution of predicted values and the baseline distribution. For instance, consider a scenario in which the target variable may have values of A, B, or C, and the baseline distribution is that 50% of the time the target variable has a value of A, while 25% of the time the target variable has a value of B, and 25% of the time it has a value of C. If the distribution of predicted values is 25% with a value of A, 50% with a value of B, and 25% with a value of C, then the prediction engine 214 may identify a significant deviation for the rate at which the target variable has values of A or B, but no deviation in the rate at which the target variable has a value of C. The prediction engine 214 may then produce a trend analysis report identifying either that a distribution deviation has occurred or, more specifically, may identify one or more of the differences between the baseline distribution of target values for the target variable and the distribution of the predicted values of the target variable. Additionally or alternatively, the procedure may proceed to operation 310 for visualization of the trend analysis produced in operation 314. Regardless of the manner by which deviations or differences are conveyed to a user, the identification of such deviations and/or differences indicates either that there may be systemic errors regarding the manner by which the newly ingested data is classified or that fundamental changes from historical data are occurring that merit further attention.

As described above, example embodiments provide methods and apparatuses for automatically training a decision tree for a target variable, and for performing additional operations using the trained decision tree, such as deriving the methodology for transformation of the target variable, visualizing the trained decision tree or information produced therefrom, or even use of the trained decision tree for identifying exceptions or unexpected trends in new data. These operations comprise technical solutions addressing the real-world need to understand, audit, and/or quality-control the data transformations relating to a particular target variable. For instance, systematically deriving the methodology for transformation of a target variable greatly enhances an organization's ability to track data lineage, and moreover ensures that such data lineage is actually cataloged, thus saving time and resources while also reducing the risk of human error or omission that has been an unavoidable issue in the past. Furthermore, automatically generating a trained decision tree that can predict the transformations relating to a target variable unlocks potential new functions, such as the ability to thereafter utilize that trained model for near-real-time exception reporting and handling and/or trend analysis. Finally, the visualization of the transformations affecting a target variable enables users to produce greater insight regarding the impact of different data elements on a given target variable, which can produce actionable insights for an organization. Altogether, the solutions set forth herein systematize and improve the consistency of data transformations, avoiding error and providing net new technical solutions that can automatically enhance the accuracy and reliability of future projects relying on such data transformations.

FIG. 3 illustrates a flowchart describing sets of operations performed by apparatuses, methods, and computer program products according to various example embodiments. It will be understood that each block of the flowchart, and combinations of blocks in the flowchart, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

What is claimed is:

1. A method for automatically deriving data transformation criteria, the method comprising:
   receiving, by communications circuitry, a source dataset and a target dataset;
   identifying, by a model generator, a target variable;
   training, by the model generator, a decision tree for the target variable using the source dataset and the target dataset such that the trained decision tree can predict a value for the target variable from new source data; and
   deriving, by a derivation engine and based on the decision tree for the target variable, a set of parameters and pseudocode for producing the target variable from the source dataset.

2. The method of claim 1, further comprising:
   cleansing, by the model generator, the source dataset and the target dataset prior to training the decision tree,
   wherein training the decision tree includes optimizing hyperparameters of the decision tree.

3. The method of claim 1, further comprising:
   determining, by the model generator, if an imbalance of values of the target variable exists in the target dataset; and
   in an instance in which an imbalance of values of the target variable in the target dataset is determined, modifying, by the model generator, the source dataset and the target dataset to reduce imbalance.

4. The method of claim 3, wherein modifying the source dataset and the target dataset to reduce imbalance includes:
   undersampling data points in the source dataset and target dataset appearing to be overrepresented; or
   oversampling data points in the source dataset and target dataset appearing to be underrepresented.

5. The method of claim 1, further comprising:
   presenting, by a visualizer, an interactive dashboard visualization of the trained decision tree, the interactive dashboard visualization enabling a user to traverse the branches of the trained decision tree.

6. The method of claim 1, wherein deriving the set of parameters and pseudocode for producing the new value for the target variable from new source data includes:
   extracting, by the derivation engine, filter criteria and associated parameters from each branch of the decision tree; and
   generating, by the derivation engine and from the extracted filter criteria and associated parameters for each branch of the decision tree, the set of parameters and pseudocode for producing the target variable from the source dataset.

7. The method of claim 1, further comprising:
   receiving, by the communications circuitry, a new source dataset and a new target dataset;
   generating, by a prediction engine and using the trained decision tree and the source dataset, a set of predicted target values;
   comparing, by the prediction engine, the set of predicted target values to corresponding data in the target dataset; and
   producing, by the prediction engine, an exception report identifying one or more differences between the set of predicted target values and the corresponding data in the target dataset.

8. The method of claim 1, further comprising:
   determining, by a prediction engine and using the target dataset, a baseline distribution of values of the target variable;
   receiving, by the communications circuitry, a new source dataset;
   generating, by the prediction engine and using the trained decision tree and the new source dataset, a set of predicted target values of the target variable;
   determining, by the prediction engine and from the set of predicted target values for the target variable, a distribution of the predicted values of the target variable;
   comparing, by the prediction engine, the baseline distribution of target values for the target variable to the distribution of the predicted values of the target variable; and
   producing, by the prediction engine, a trend analysis report identifying one or more differences between the baseline distribution of target values for the target variable and the distribution of the predicted values of the target variable.

9. An apparatus for automatically deriving data transformation criteria, the apparatus comprising:
   communications circuitry configured to receive a source dataset and a target dataset;
   a model generator configured to
     identify a target variable, and
     train a decision tree for the target variable using the source dataset and the target dataset such that the trained decision tree can predict a value for the target variable from new source data; and
   a derivation engine configured to derive, based on the decision tree for the target variable, a set of parameters and pseudocode for producing the target variable from the source dataset.

10. The apparatus of claim 9,
    wherein the model generator is further configured to cleanse the source dataset and the target dataset prior to training the decision tree, and
    wherein training the decision tree includes optimizing hyperparameters of the decision tree.

11. The apparatus of claim 9, wherein the model generator is further configured to:
    determine if an imbalance of values of the target variable exists in the target dataset; and
    in an instance in which an imbalance of values of the target variable in the target dataset is determined, modify the source dataset and the target dataset to reduce imbalance.

12. The apparatus of claim 11, wherein modifying the source dataset and the target dataset to reduce imbalance includes:
    undersampling data points in the source dataset and target dataset appearing to be overrepresented; or
    oversampling data points in the source dataset and target dataset appearing to be underrepresented.

13. The apparatus of claim 9, further comprising:
    a visualizer configured to present an interactive dashboard visualization of the trained decision tree, the interactive dashboard visualization enabling a user to traverse the branches of the trained decision tree.

14. The apparatus of claim 9, wherein the derivation engine is configured to derive the set of parameters and pseudocode for producing the new value for the target variable from new source data by:
    extracting filter criteria and associated parameters from each branch of the decision tree; and generating, from the extracted filter criteria and associated parameters for each branch of the decision tree, the set of parameters and pseudocode for producing the target variable from the source dataset.

15. The apparatus of claim 9, further comprising:
communications circuitry configured to receive a new source dataset and a new target dataset; and
a prediction engine configured to
generate, using the trained decision tree and the source dataset, a set of predicted target values;
compare the set of predicted target values to corresponding data in the target dataset, and
produce an exception report identifying one or more differences between the set of predicted target values and the corresponding data in the target dataset.

16. The apparatus of claim 9, further comprising:
communications circuitry configured to receive a new source dataset; and
a prediction engine configured to
determining, using the target dataset, a baseline distribution of values of the target variable,
generate, using the trained decision tree and the new source dataset, a set of predicted target values of the target variable,
determine, from the set of predicted target values for the target variable, a distribution of the predicted values of the target variable,
compare the baseline distribution of target values for the target variable to the distribution of the predicted values of the target variable, and
produce, a trend analysis report identifying one or more differences between the baseline distribution of target values for the target variable and the distribution of the predicted values of the target variable.

17. A computer program product for automatically deriving data transformation criteria, the computer program product comprising at least one non-transitory computer-readable storage medium storing software instructions that, when executed, cause an apparatus to:
receive a source dataset and a target dataset;
identify a target variable;
train a decision tree for the target variable using the source dataset and the target dataset such that the trained decision tree can predict a value for the target variable from new source data; and
derive, based on the decision tree for the target variable, a set of parameters and pseudocode for producing the target variable from the source dataset.

18. The computer program product of claim 17, wherein deriving the set of parameters and pseudocode for producing the new value for the target variable from new source data includes:
extracting filter criteria and associated parameters from each branch of the decision tree; and
generating, from the extracted filter criteria and associated parameters for each branch of the decision tree, the set of parameters and pseudocode for producing the target variable from the source dataset.

19. The computer program product of claim 17, wherein the software instructions, when executed, further cause the apparatus to
receive a new source dataset and a new target dataset;
generate, using the trained decision tree and the source dataset, a set of predicted target values;
compare the set of predicted target values to corresponding data in the target dataset; and
produce an exception report identifying one or more differences between the set of predicted target values and the corresponding data in the target dataset.

20. The computer program product of claim 17, wherein the software instructions, when executed, further cause the apparatus to
determine, using the target dataset, a baseline distribution of values of the target variable;
receive a new source dataset;
generate, using the trained decision tree and the new source dataset, a set of predicted target values of the target variable;
determine, from the set of predicted target values for the target variable, a distribution of the predicted values of the target variable;
compare the baseline distribution of target values for the target variable to the distribution of the predicted values of the target variable; and
produce a trend analysis report identifying one or more differences between the baseline distribution of target values for the target variable and the distribution of the predicted values of the target variable.

* * * * *